United States Patent
Weelink

[11] Patent Number: 5,477,654
[45] Date of Patent: Dec. 26, 1995

[54] GRID FLOOR FOR A CATTLE STABLE

[76] Inventor: Johannes M. W. Weelink, No. 58, Tynaarlosestraat, Vries, Netherlands, NL-9481 AD

[21] Appl. No.: 186,513

[22] Filed: Jan. 26, 1994

[30] Foreign Application Priority Data

Feb. 2, 1993 [NL] Netherlands ............................ 9300207
Dec. 16, 1993 [EP] European Pat. Off. .............. 93203565

[51] Int. Cl.⁶ ........................... A01K 1/01; A01K 1/015; E04C 2/42
[52] U.S. Cl. .................. 52/664; 52/660; 119/28
[58] Field of Search .......................... 119/28, 27; 52/664, 52/660

[56]  References Cited

U.S. PATENT DOCUMENTS

| | | | |
|---|---|---|---|
| 3,225,739 | 12/1965 | Brodrick | 119/28 |
| 3,824,960 | 7/1974 | Kaltenbock | 119/28 |
| 3,837,319 | 9/1974 | Lehe. | |
| 3,862,464 | 1/1975 | Arens | 52/664 X |
| 4,135,339 | 1/1979 | Pawlitschek | 119/28 X |
| 4,176,622 | 4/1979 | Wolf. | |
| 4,227,486 | 10/1980 | Kaufman et al. | 119/28 |
| 4,231,325 | 4/1980 | Parks | 119/28 |
| 4,794,879 | 1/1989 | Thom et al. | 119/28 X |
| 5,289,912 | 3/1994 | Faulstich | 119/28 X |

FOREIGN PATENT DOCUMENTS

| | | |
|---|---|---|
| 341819 | 2/1978 | Austria . |
| 2910767 | 10/1980 | Germany . |
| 3229671 | 2/1984 | Germany . |
| 8003290 | 12/1980 | Netherlands . |
| 9001055 | 12/1991 | Netherlands . |
| 423343 | 4/1967 | Switzerland . |
| 1124908 | 8/1968 | United Kingdom . |

*Primary Examiner*—Carl D. Friedman
*Assistant Examiner*—Christopher Todd Kent
*Attorney, Agent, or Firm*—Evenson, McKeown, Edwards & Lenahan

[57]  ABSTRACT

The invention relates to a grid floor for a cattle stable. This floor comprises a grid formed by a number of mutually parallel supported beams with interspaces and a receiving surface arranged under the grid with a passage opening. The surface of the receiving surface is smooth and transporting means are arranged which are movable over the receiving surface and to the passage opening.

15 Claims, 7 Drawing Sheets

GRID FLOOR FOR A CATTLE STABLE

BACKGROUND AND SUMMARY OF THE INVENTION

The invention relates to a grid floor for a cattle stable comprising a number of mutually parallel supported girders with interspaces.

Usually situated under such a grid floor used in cattle stables is a manure cellar in which the (liquid) manure sinking through the grid floor is collected.

A significant environmental problem associated with cattle farming is the emission of ammonia from the manure. The invention now has for its object to provide a grid floor which contributes to easing of this problem.

In the grid floor according to the invention as characterized in claim 1 the receiving surface closes off toward the top the free surface of the manure in the manure cellar so that the direct ammonia emission out of the manure cellar is greatly restricted. The transporting means remove the (liquid) manure that has fallen through the grid onto the receiving surface via the passage opening to the manure cellar. Because the receiving surface takes a smooth form no or only very little (liquid) manure remains behind on the receiving surface so that no or little ammonia emission occurs herefrom.

A favourable embodiment is characterized in claim 2. The (liquid) manure lying on the receiving surface is urged by the scraper sideways to the gap. The transporting means can hereby be of relatively simple construction.

In order to enable prefabrication of the grid floor according to the invention and rapid installation thereof in a cattle stable, the step of claim 3 is preferably applied.

The application of the step of claim 4 achieves the effect that the liquid manure flows away directly over the receiving surface to the manure cellar.

According to a further development of the invention, the step of claim 5 is applied. The (liquid) manure hereby drips from the drip edges so that only the top surface and the drip edges function as an ammonia-emitting surface. The remaining part of the T-profile remains clean. The total ammonia-emitting surface of the grid itself is hereby limited so that the ammonia emission of the floor is likewise limited.

With the grid floor according to the invention, the ammonia-emitting surface is thus greatly reduced. As is known, roughly half the ammonia released in a cattle stable with a conventional grid floor comes from the grid floor and the other half from the manure cellar. By now according to the invention greatly limiting the emitting surface of the grid floor and the manure cellar, the ammonia emission from the cattle stable is likewise greatly limited.

The girders of the grid floor according to the invention can take a comparatively narrow form due to their T-profile. In preference, the T-profiles are so dimensioned as stated in claim 6. The percentage of open surface of the grid floor is hereby enlarged so that the emitting surface of the grid floor decreases proportionally. The bending stiffness of the girders is partly determined by the height of the body of the T-profile and this body can be made extra high to achieve the desired bending stiffness. The surface of the body remains clean and does not therefore contribute to the ammonia emission. With a narrowing of the flange and a raising of the height of the leg of the T-profile, a reduction is thus achieved in the effective emitting surface.

In stables for calves or pigs the flange can even be as wide as the interspaces between adjacent girders.

In order to obtain a comfortable surface for the cattle, the step of claim 7 is preferably applied. A favourable embodiment is herein characterized in claim 8. The sloping upper surface moreover enables the (liquid) manure falling onto the upper surface to be drained as quickly as possible sideways to the manure cellar.

The T-profiles for the grid floor according to the invention can be special hot or cold-rolled profiles with integrated drip edges. According to a further favourable development of the invention however, the T-profiles can also be commercially available steel profiles which are then provided with separate drip edges. A favourable embodiment is herein characterized in claim 10. The cap can then simultaneously have the suitable grip-providing surface.

With the favourable embodiment as characterized in claim 10, the cap can snap onto the T-profile.

Another favourable embodiment is characterized in claim 11. The reverse U-shaped steel profile is preferably a profile cold-rolled from plate material. This can be dimensioned such that it clamps precisely around the flange of the commercially available steel profile. Further connecting steps are unnecessary.

When therein the step of claim 12 is applied, a grid floor according to the invention is obtained with a long lifespan. Only the outer surface of the cap is herein exposed to the effect of (liquid) manure. The steel T-profile itself remains wholly free of contact with (liquid) manure.

According to a suitable further development, the step of claim 13 is applied.

A further favourable development of the invention is characterized in claim 14. The flexible strips form flaps which can allow (liquid) manure to pass downward but which spring back after this passage into a substantially closed situation, whereby the emission of ammonia from the manure cellar is at least greatly limited. Because the strips are arranged under the flanges, for instance against the leg of the T-profile, they can have a substantial width so that they have an adequate flexibility.

When in addition to or instead thereof the step of claim 15 is applied the manure cellar is moreover wholly closed by the flexible strips so that the emission from the cellar is further limited.

In preference the step of claim 16 is applied herein. The non-stick material ensures that no manure or liquid manure adheres to the surface of the strips so that these do not contribute to the effective emitting surface.

A suitable material is therein characterized in claim 17.

A further favorable embodiment is characterized in claim 18. The separate fingers provide the strips with a very good flexibility so that with certainty they can deflect sufficiently to allow through the (liquid) manure.

The invention will be further elucidated in the following description with reference to the embodiments shown in the figures.

DETAILED DESCRIPTION OF THE DRAWINGS

Figure 1:
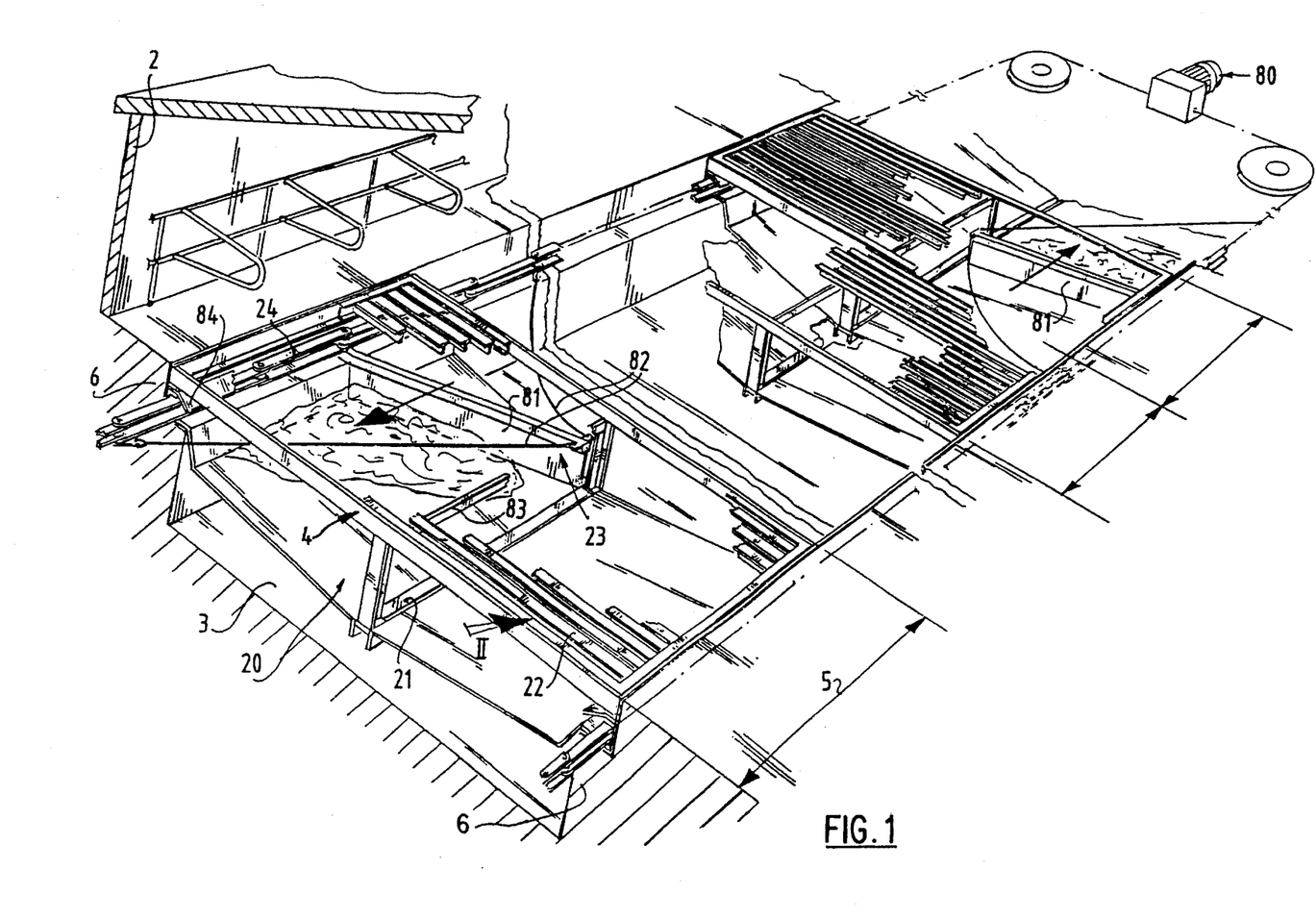
FIG. 1 shows a partly broken away perspective view of a cattle stable with a grid floor according to the invention.

The cattle stable 1 shown in FIG. 1 is a building 2 in which cattle can be accommodated. The cattle can walk around over a floor partly comprising a grid floor 4. The grid floor 4 comprises grid parts 22 shown in more detail in FIG. 2 which are received in construction parts in which a receiving surface 20 is formed onto which drops the (liquid) manure which has fallen through the grid. Located beneath the receiving surface 20 is a manure cellar 3 in which is collected (liquid) manure excreted by the cattle.

As can be seen in FIG. 1, the floor elements 5 are laid at either end on supporting walls 6. The elements 5 can thus optionally be removed when access to the cellar 3 is necessary.

Each element 5 is embodied as construction part. A number of these construction elements 5 is arranged mutually connecting in lengthwise direction of grid floor 4.

The receiving surface 20 consists in the embodiment of FIG. 1 of two parts running obliquely toward the middle. Left open between these parts is a gap 21 which forms the passage opening through which the (liquid) manure which has fallen onto the receiving surface 20 can drop into the manure cellar 3 lying thereunder.

Transporting means 23 in the form of manure scrapers are movable over the receiving surface 20. The scrapers are driven by a chain conveyor 24 arranged in the side of the floor parts. The chain conveyor 24 extends around the grid floor 4 so that a single drive 80 can suffice. By switching on this drive 80 in opposing directions the manure scrapers 81 are moved in opposing directions, as designated with the arrows, over the parts of the receiving surface 20.

In the embodiment shown, the manure scrapers 81 are mounted hingedly on chain conveyor 24 and are supported by cables 82. These latter have a length such that manure scraper 81 comes to lie each time slightly obliquely of the driving direction, whereby the pushed away manure is guided in the direction of gap 21.

During the return stroke the manure scraper 81 "switches" over so that an effective transporting action also results during the return stroke.

As shown, the parts of the receiving surface 20 run downward towards the middle so that liquid manure can flow directly over the receiving surface 20 via the gap 21 to the manure cellar 3.

The construction of floor element 5 is such that it forms a rigid whole. The girders of grid element 22 can support in the middle on a cross beam 83 whereby the span of the girders is halved and they can be embodied correspondingly lighter while retaining the required bearing capacity.

The chain conveyor 24 is arranged at a higher level than receiving surface 20 and a cover 84 is moreover arranged thereover so that the chain 24 is protected against fouling by manure.

The receiving surface 20 takes a smooth form so that the manure scrapers 81 can slide the manure into the gap 21 practically without remnants being left behind. Because the receiving surface 20 can thus be effectively kept free of (liquid) manure, hardly any or no ammonia emits herefrom. As can be seen clearly in the figure, the receiving surface 20 closes off manure cellar 3 so that emission from the cellar 3 itself is also prevented.

Figure 2:
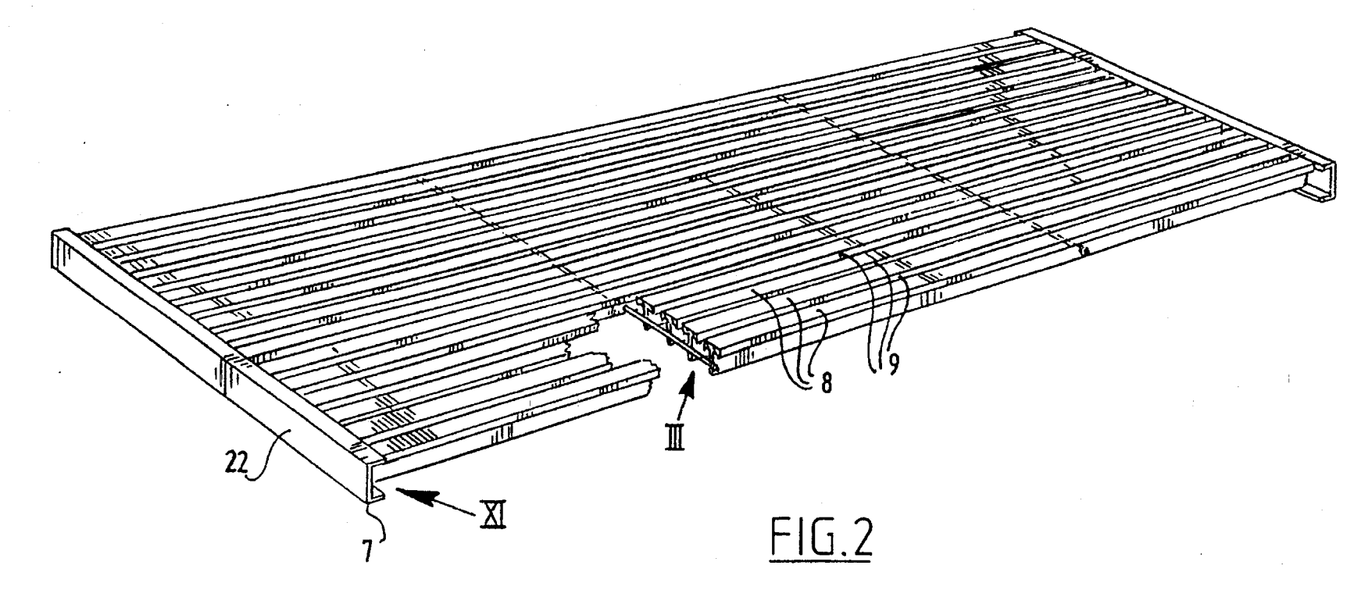
FIG. 2 shows a grid floor element designated with II in FIG. 1 in partly broken away perspective view.

As shown in more detail in FIG. 2, the grid part 22 is assembled from a number of girders 8 extending mutually parallel with interspaces and having a T-profile.

The girders are received at their ends in edge profiles 7 which in the embodiment shown are formed by U-profiles placed on a side. The T-profiles 8 are connected to the edge profiles 7 so that the floor element 5 forms one whole.

Figure 3:
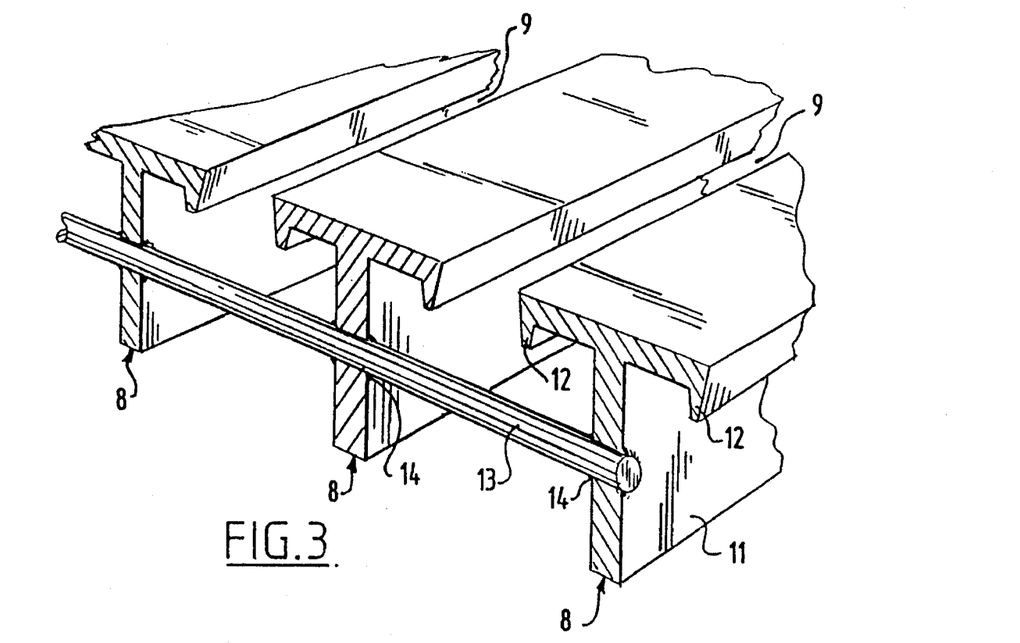
FIG. 3 is a view along arrow III in FIG. 2.

FIG. 3 shows the T-profiles 8 in more detail. Each T-profile is supported standing upright so that the top surfaces thereof form the floor surface over which the cattle can move. The T-profile comprises in the usual manner in addition to the flange 10 a body 11 which thus extends vertically and partly determines the bending stiffness of the profile.

As FIG. 3 clearly shows, each flange 10 is provided on either side with downward extending drip edges 12. These drip edges 12 ensure that the (liquid) manure falling onto an associated flange 10 drip downward from the drip edge 12 into the manure cellar. The bottom surface of flange 10 and the body 11 of the T-profile thus remain free of (liquid) manure. The surface of the grid floor according to the invention which can be covered with (liquid) manure is thus limited to the upper surface of flange 10 and the side faces and lower edge of drip edges 12. This surface is considerably smaller than in the case of the usual grid floors with reversed truncated triangular concrete girders.

In the embodiment shown T-profiles 8 are applied with a width of the flange 10 which at most is twice the width of the interspace 9. In a suitable embodiment the flange 10 can for instance be 4 cm wide and the interspace 9 3–3.5 cm. A grid floor according to the invention hereby has a larger number of gaps formed by the interspaces 9 than a normal grid floor, so that in this way the total ammonia-emitting surface of the floor is also limited. The required bending stiffness of the T-profiles is obtained by a suitable choice of the length of the body 11 of each profile. Since this body does not come into contact with the (liquid) manure it does not contribute to the enlarging of the emitting surface.

In the embodiment of FIG. 3 a number of holes 14 is arranged in each body 11 of the T-profiles, through which holes is inserted a rod 13 which is welded at the position of each T-profile. The thus formed grid floor element can thereafter be galvanized so that a good resistance to the effect of (liquid) manure is obtained.

Figure 4:
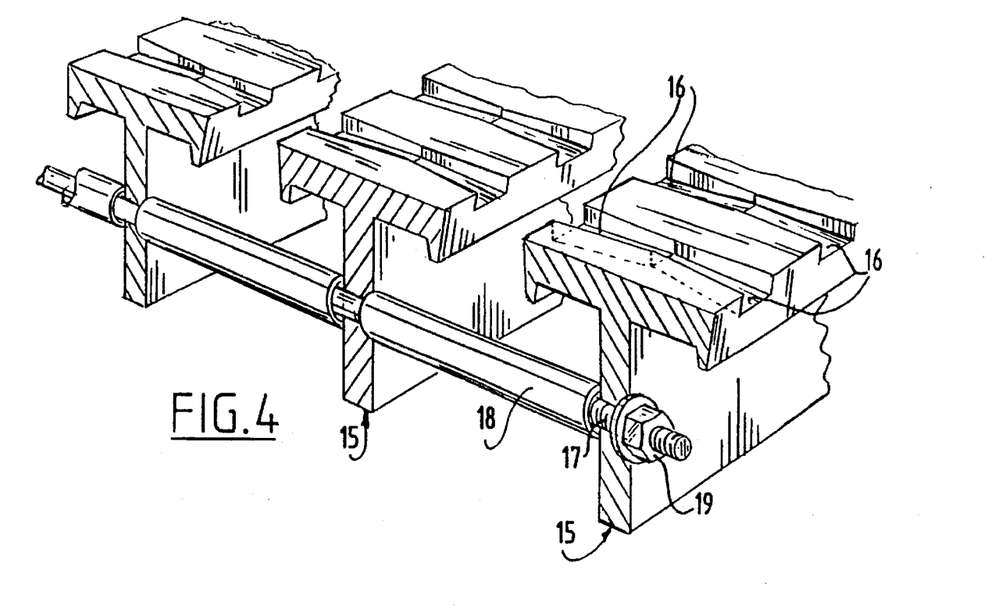
FIG. 4 shows a view corresponding with FIG. 3 of another embodiment.

FIG. 4 shows another embodiment. T-profiles 15 with drip edges are also used here. Grooves 16 are formed in the upper surface of each T-profile 15 so that the cattle has a good grip on the floor. The grooves extend in transverse direction of the profiles 15. The cattle already has sufficient grip in transverse direction of the girders as a result of the interspaces between the profiles. In lengthwise direction of the girders the grip is provided by the grooves 16.

As shown in FIG. 4, the grooves 16 are embodied such that they diverge in outward direction in both horizontal and vertical directions. The drainage of (liquid) manure which has fallen onto the floor is hereby enhanced and clogging of the grooves avoided.

In the embodiment of the grid floor according to the invention shown in FIG. 4, the T-profiles are mutually joined into a floor element by means of a threaded rod 17, on the ends of which are arranged nuts 19. The interspaces between the T-profiles are defined by sleeves 18. With this method of assembly the profile girders can be pre-galvanized as well as the threaded rod 17, sleeves 18, nuts 19 and the like.

These components can also be manufactured instead from for instance stainless steel.

Figures 5, 6:
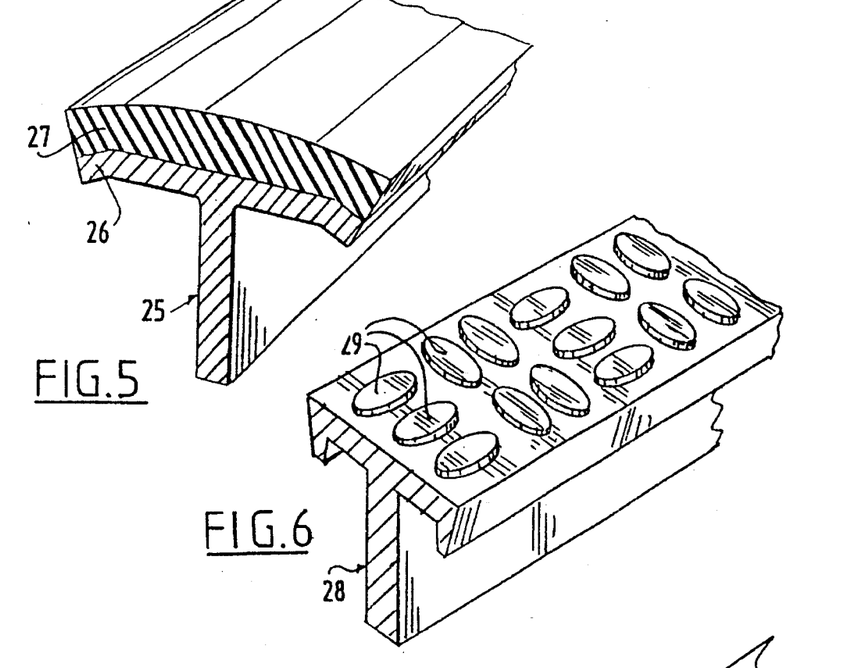
FIG. 5-10 show embodiment variants of T-profiles for a grid floor according to the invention.

FIG. 5 shows a T-profile for a grid floor according to the invention. A thick layer of rubber-like material is arranged on the flange of the T-profile 25. This provides the cattle with a good grip. The end edges 26 of the flange of the T-profile protrude obliquely downward, whereby the drip edges are formed. The upper surface of the rubber covering 27 tapers toward the side edges, whereby liquid manure falling onto the upper surface does not remain thereon but runs directly to the side edges and is drained between the adjacent girders to the manure cellar.

The T-girder 28 of FIG. 6 has a grip-providing surface in that it is embodied with a profiling 29 corresponding with that used in so-called tear plates.

The grooves 16 can be arranged for instance by milling. Another possibility is that the profile 15 is hot-rolled wherein the grooves are pressed into the surface. The profiling 29 of T-profile 28 can be arranged for instance by rolling.

Figure 7:
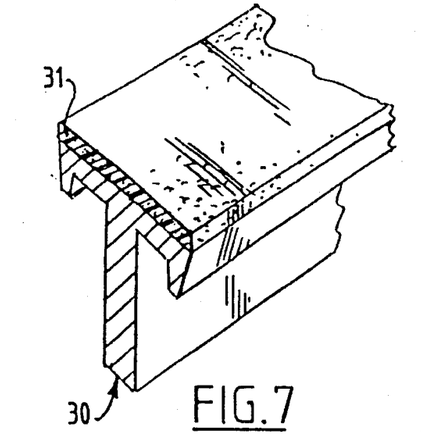
Figure 8:
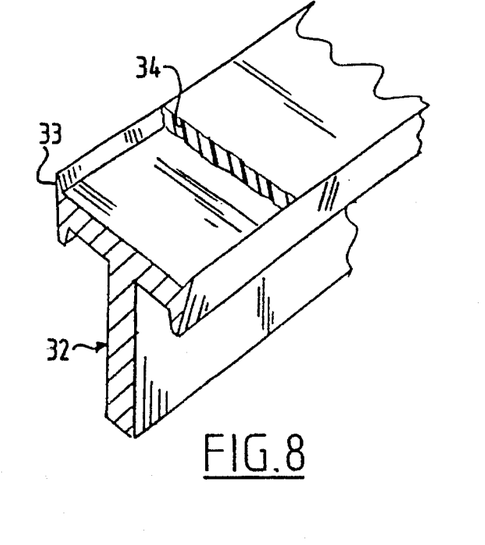

FIG. 7 and 8 show other embodiments wherein the upper surface of the girders contains a separate layer consisting of a hard granular material embedded in a binder. T-profile 30 carries this layer 31 directly on its upper surface.

In the profile 32 of FIG. 8 standing edges 33 are arranged which can hold the layer 34 enclosed therebetween to prevent crumbling of the edges thereof. The material of the layers 31 and 34 can correspond for instance with that used for wearing courses on roads, that is, sand or gravel embedded in a plastic binder or in bitumen. The layer can for instance be arranged by disposing a number of the profiles 30 and 32 mutually adjacent with the flanges against each other, whereby a closed surface is formed. On this closed surface the layer can then be applied. The profiles are thereafter once again removed from each other and each profile 30, 32 will be provided with an individual covering.

Figures 9, 10:
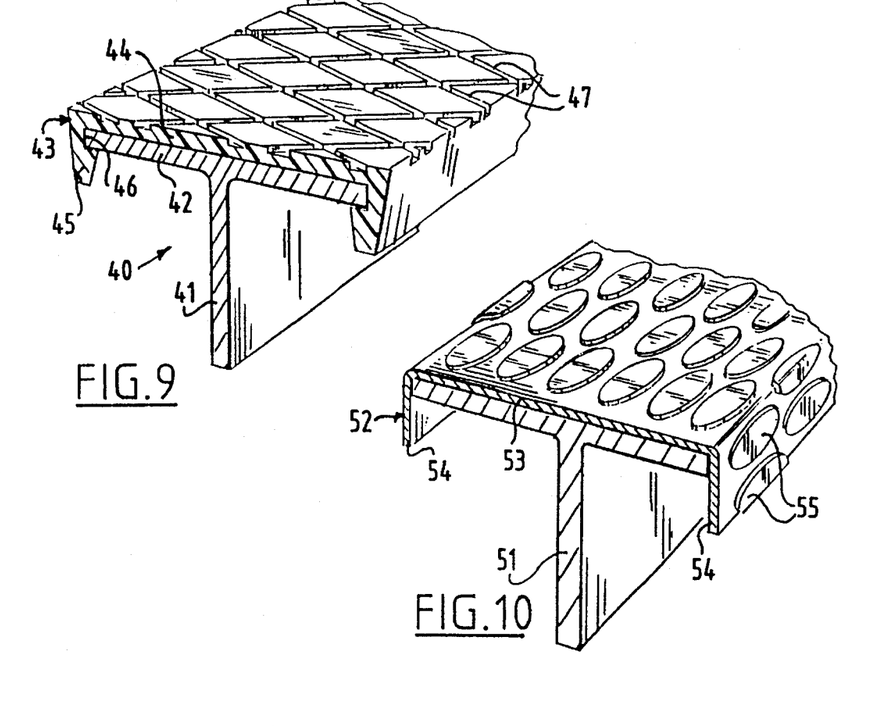

In the above described embodiments the T-profile is provided integrally with drip edges. These drip edges can however also form part of separate element. FIG. 9 thus shows a profile girder 40 according to the invention assembled from a commercially available T-profile 41 and a cap 43 arranged on the flange 42 thereof. In this embodiment this cap 43 is an extrusion profile of for instance aluminium or a plastic. As can be seen, the cap 43 is substantially reverse U-shaped and the body 44 thereof forms the upper surface of girder 40. In this upper surface is formed a profiling 47 to provide the cattle with the desired grip. The legs of the U of cap 43 form the drip edges 45. Formed on the inner side of the legs 45 close to the body 44 is a groove 46 which receives the end edges of the flange 42 of the T-profile 41. The cap 43 can be arranged simply on T-profile 51 by pressing it thereon, wherein cap 43 bends outward until the end edges of flange 42 snap into the grooves 46.

Also in the case of the T-profile girder 50 of FIG. 10, the bearing part is formed by a commercially available T-profile. Arranged on the flange hereof is a cap 52 which is here also U-shaped and manufactured from cold-rolled tear plate. The bent edges 54 formed by the cold-rolling form the drip edges of girder 50. The body 53 of this U-profile has the tear plate profiling 55 and thus gives the cattle the desired grip. The cap 52 can be dimensioned such that it just clamps onto the upper flange of the T-profile. Further fixing means are then not necessary. A grid floor element to be manufactured with girders of this embodiment is first built up of the T-profiles 51, which can for instance be mutually connected by rods as shown in FIG. 3. At the ends the girders are welded into edge profiles, such as the U-profiles 7 shown in FIG. 1 and 2. The thus manufactured intermediate product can then be galvanized and the caps 52 made from the cold-rolled tear plate can be pressed afterward onto the flanges of the T-profiles.

The cold-rolled cap can be of galvanized steel plate but can in suitable manner also be of stainless steel. Profilings other than those generally used with tear plate are of course also possible.

Figure 11:
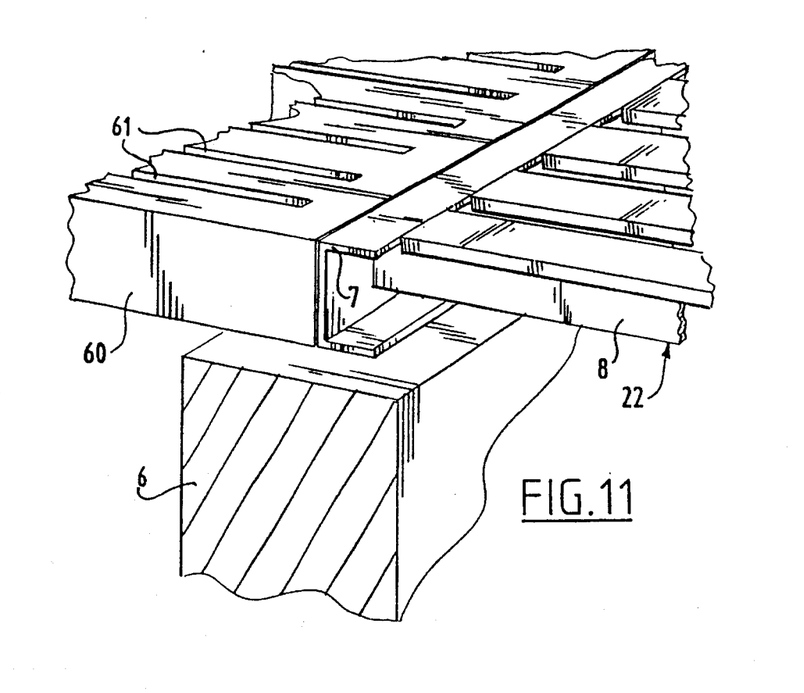
FIG. 11 shows the laying of a grid floor element according to the invention as seen in the direction of arrow XI in FIG. 2.

FIG. 11 shows the grid floor element 22 of FIG. 2 laid onto a supporting wall 6 adjoining a portion of conventional grid floor 60 with gaps 61. As shown, the U-shaped edge profile 7 is herein chosen such that it has the same height as the conventional concrete girder 60. A grid floor according to the invention can thus be used in existing sheds for full or partial replacement of conventional grid floors.

Figure 12:
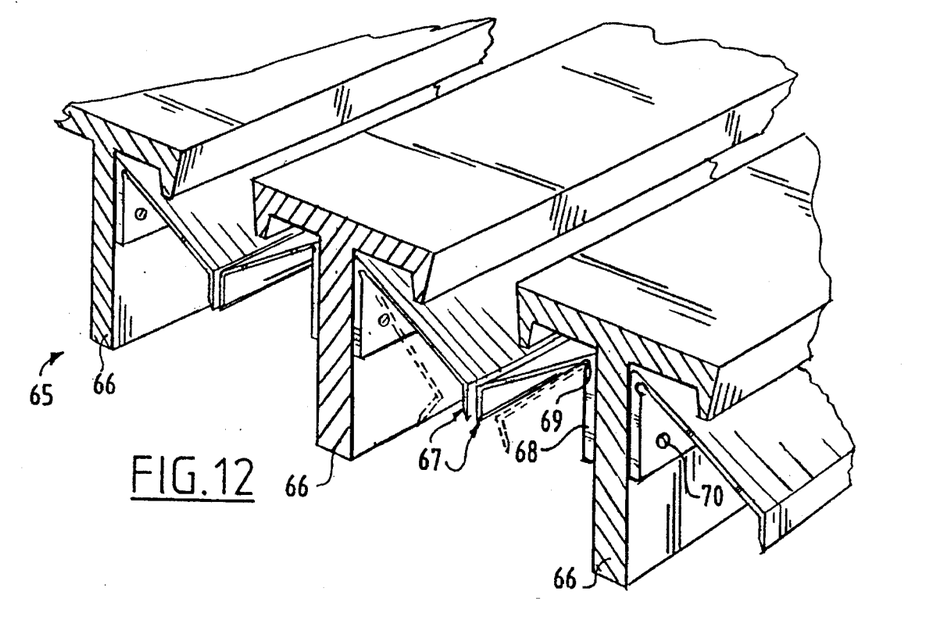
FIG. 12 shows a view corresponding substantially with FIG. 3 of a further developed embodiment.

The grid floor 65 shown in FIG. 12 is depicted with a number of T-profiles as also shown in FIG. 3. Other of the shown embodiments can however also be used for this purpose. Grid floor 65 has, as additional step, strips 67 which extend outward and inclining downward under the flanges. The end edges of adjoining strips 67 lie practically against one another so that two adjoining strips 67 in each case form a closure. The strips 67 are provided with fixing flanges 68 with which they are screwed in position against the legs of the T-profiles 66. In the embodiment shown here the strips 67 are extruded from flexible material and between the fixing flange 68 and the actual strip 67 a thinner portion 69 is formed which functions as hinge.

The (liquid) manure falling onto the grid floor flows between the interspace of the T-girders 66 and drips from the drip edges onto strips 67. Because strips 67 are flexible they move apart due to the weight of the (liquid) manure and thus allow this (liquid) manure through to the manure cellar. After the (liquid) manure has passed through, the strips 67 spring back again until the ends thereof make mutual contact, whereby the manure cellar is closed off again and the escape of ammonia therefrom inhibited.

In order to prevent manure caking onto the surface of the strips or the surface thereof remaining moistened with manure and urine, the strips 67 can be manufactured in suitable manner from non-stick material such as for instance polytetrafluoroethylene (PTFE). The strips can also be provided in favourable manner with a layer of non-stick material such as for instance a silicon-containing material.

Figure 13:
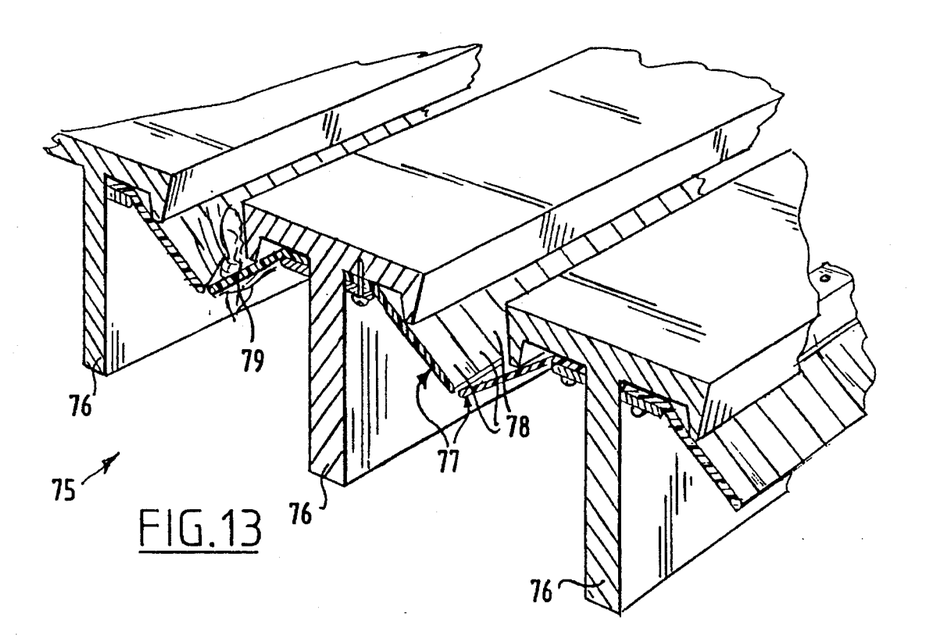
FIG. 13 shows a view corresponding with FIG. 12 of an embodiment variant.

The grid floor 75 of FIG. 13 is also assembled from a number of T-profiles 76 with strips 77 arranged under the flanges thereof. Strips 77 are herein mounted under and against the flanges of the profiles 76.

In this embodiment strips 77 are assembled from individual fingers 78 which are each separately very flexible due to their small width. Passage of manure 79 is hereby greatly enhanced and the danger of manure remaining on strips 77 and drying thereon hereby becomes minimal.

Because, as can be seen clearly in FIG. 12 and 13, the strips 67 respectively 77 extend beneath the flanges of the T-profiles they have a considerable width so that they can attain the desired flexibility.

Figure 14:
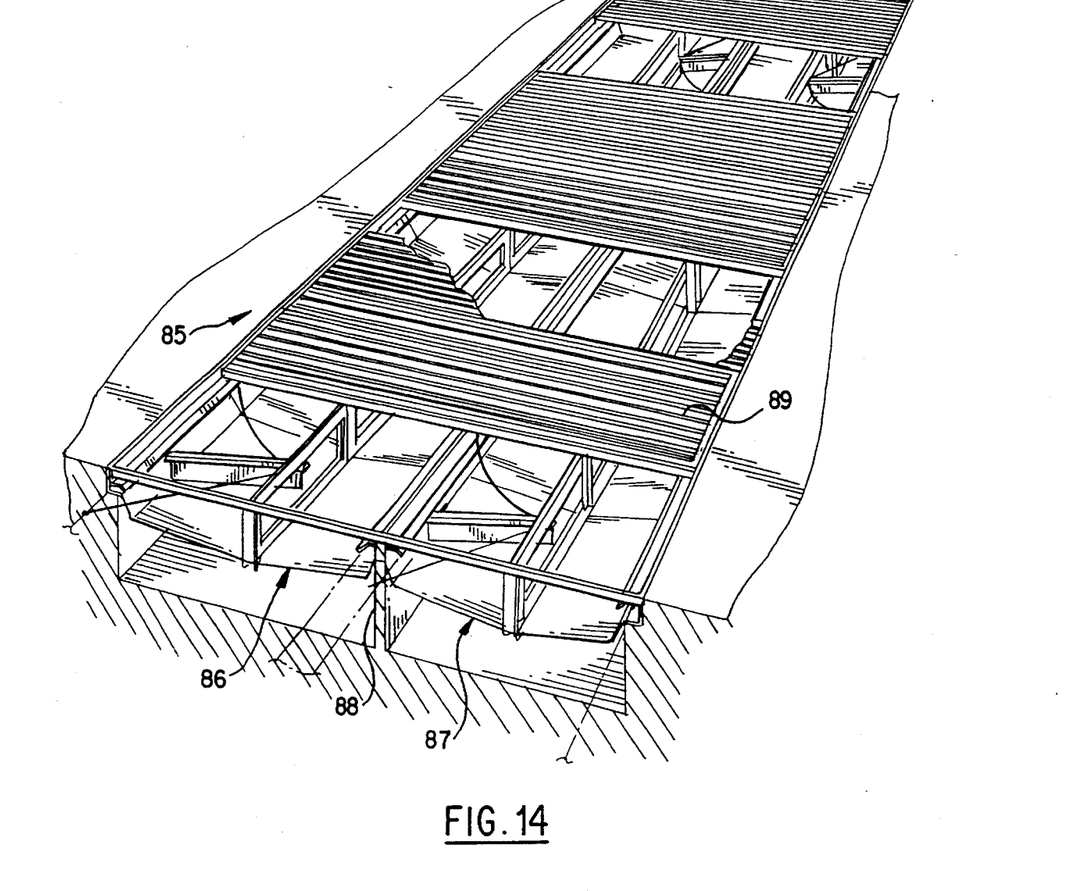
FIG. 14 shows a perspective view partly corresponding with FIG. 1 of another embodiment.

When the grid floor according to the invention has a gap-like drain opening in the receiving surface, as shown in the FIGS. 1 and 14, closing strips can also be arranged at the location of this gap in a manner corresponding with FIG. 12 and 13.

FIG. 14 shows an embodiment of a grid floor 85 according to the invention which is assembled from two parts 86 and 87 extending in lengthwise direction. In this embodiment the parts 86 and 87 are supported in the middle of the floor by a wall 88. It is however also possible to embody the parts 86 and 87 as a rigid whole such that they can bridge the whole breadth.

By thus dividing up the grid floor into more parts, the grid elements 89 can be supported at more places along their length, in the embodiment of FIG. 14 at three separate places, whereby the T-girders of the grid elements can be of light construction. This limits costs.

As in the embodiment of FIG. 1, the parts 86 and 87 can be assembled from prefabricated elements which are connected together in situ.

The invention is not limited to the embodiments shown in the figures. The transporting means do not have to be embodied as scrapers but can for instance also be formed by transporting means operating with air or water jets. The receiving surface can be embodied horizontally and the passage openings can be arranged in a manner other than shown in the figures. A number of separate openings can for instance be formed in the receiving surfaces or gaps extending at regular distances transversely of the longitudinal direction can also form the passage openings.

All these embodiments are deemed to fall within the scope of the appended claims.

What is claimed is:

1. Grid floor for a cattle stable comprising a grid formed by a number of mutually parallel supported girders with interspaces, a receiving surface arranged under the grid with a passage opening, a manure cellar arranged below the grid and receiving surface, the passage opening leading to the manure cellar which is otherwise closed-off by the receiving surface, wherein the surface of the receiving surface is smooth and wherein transporting means are arranged movable over the receiving surface and to the passage opening.

2. Grid floor as claimed in claim 1, which is rectangular, wherein the passage opening is a gap extending in lengthwise direction and wherein the transporting means comprise at least one scraper which is guided for movement in the lengthwise direction over a part of the receiving surface adjacent to the gap.

3. Grid floor as claimed in claim 2, wherein said grid is assembled from a number of parts which connect together in lengthwise direction and in which a grid part is received removably in each case.

4. Grid floor as claimed in claim 3, wherein parts of the receiving surface adjacent to the gap incline obliquely downward to the gap.

5. Grid floor as claimed in claim 1, wherein each girder has substantially a T-profile which is supported standing upright so that the upper surface of the flanges of adjacent girders form a floor surface, and wherein each flange is provided on either side with downward extending drip edges.

6. Grid floor as claimed in claim 5, wherein each flange is at most twice as wide as the interspaces.

7. Grid floor as claimed in claim 5, wherein the upper surface of the girders has a grip-providing surface.

8. Grid floor as claimed in claim 7, wherein the grip-providing surface is formed by a thick layer of rubbery material with a top surface tapering to the side edges.

9. Grid floor as claimed in claim 5, wherein the T-profile is a commercially available steel profile.

10. Grid floor as claimed in claim 1, wherein each girder bears on either side flexible strips arranged under the flange thereof which extend outward and obliquely downward, wherein the longitudinal edges of adjacent strips are at least practically in mutual contact.

11. Grid floor as claimed in claim 2, wherein the gap bears flexible strips arranged on either side thereof and extending obliquely downward therein, wherein the longitudinal edges of adjacent strips are at least practically in mutual contact.

12. Grid floor as claimed in claim 10, wherein the strips are provided with a layer of non-stick material or are manufactured from such material.

13. Grid floor as claimed in claim 12, characterized in that the strips are provided with a layer of PTFE or are manufactured therefrom.

14. Grid floor as claimed in claim 10, characterized in that each strip is assembled in lengthwise direction of mutually adjacent fingers.

15. Grid floor as claimed in claim 11, wherein the strips are provided with a layer of non-stick material or are manufactured from such material.

* * * * *